United States Patent [19]

Delebarre

[11] Patent Number: 4,648,330

[45] Date of Patent: Mar. 10, 1987

[54] APPARATUS FOR INJECTING FLUIDIZATION GAS

[75] Inventor: Arnaud Delebarre, Lille, France

[73] Assignee: Charbonnages de France, Paris, France

[21] Appl. No.: 726,463

[22] Filed: Apr. 24, 1985

[30] Foreign Application Priority Data

Apr. 25, 1984 [FR] France ............................ 84 06490

[51] Int. Cl.⁴ .......................................... F23C 11/02
[52] U.S. Cl. ................................ 110/263; 34/57 A; 110/245; 431/170; 432/58
[58] Field of Search .............. 110/245, 263; 34/57 A; 432/58; 122/4 D; 431/7, 170

[56] References Cited

U.S. PATENT DOCUMENTS

| | | | |
|---|---|---|---|
| 3,009,513 | 11/1961 | Houdry | 431/7 |
| 3,259,998 | 7/1966 | Leclere et al. | 34/574 |
| 4,338,283 | 7/1982 | Sakamato et al. | 431/170 X |
| 4,340,000 | 7/1982 | Hein | 110/245 |
| 4,343,247 | 8/1982 | Chronowski | 432/58 X |
| 4,349,969 | 9/1982 | Stewart et al. | 122/4 D X |

FOREIGN PATENT DOCUMENTS 74668 3/1983 European Pat. Off.
88638 9/1983 European Pat. Off.
2839821 9/1984 Fed. Rep. of Germany.

OTHER PUBLICATIONS

Nagahara, "Fluidizing Method and Apparatus for Fluidized Bed," Japanese Patent Application No. 57-105616, Chemical Abstracts, vol. 98, 6/1983, p. 71.
Chemical Abstracts, vol. 98, No. 2, Janvier, 6/1983, p. 71, No. 5797y, Columbus, Ohio (USA); & JP-A-57 105616, (Kawasaki Heavy Industries, Ltd.) (01-0-7-1982), FIGS. 2-4.

Primary Examiner—Albert J. Makay
Assistant Examiner—Steven E. Warner
Attorney, Agent, or Firm—Cushman, Darby & Cushman

[57] ABSTRACT

A vertical conduit closed at one end by a head wall and connected at its opposite end to a fluidization gas delivery means is provided with side blowing nozzles longitudinally spaced in planes. A shutter is movable inside the conduit so that the bed in which the conduit is disposed in use can be progressively brought into a state of fluidization by supplying fluidization gas to the nozzles successively and cumulatively starting from the top. The invention obviates the need for the introduction via the bottom of the fluidized bed of compressed air at a high pressure when starting up the fluidization of the bed.

5 Claims, 6 Drawing Figures

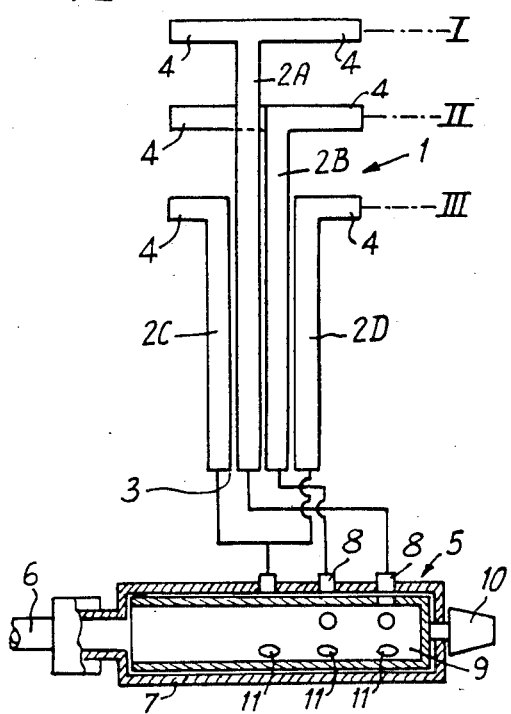
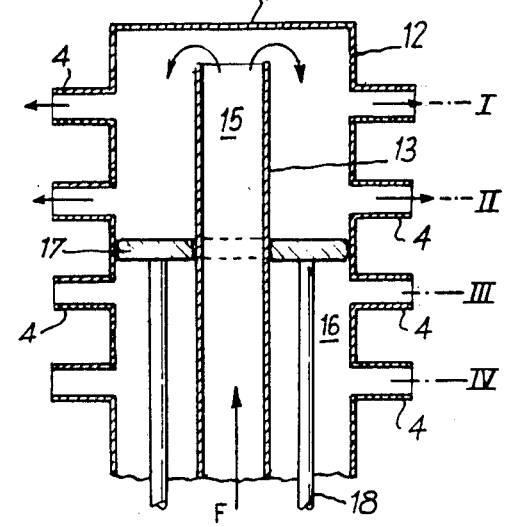
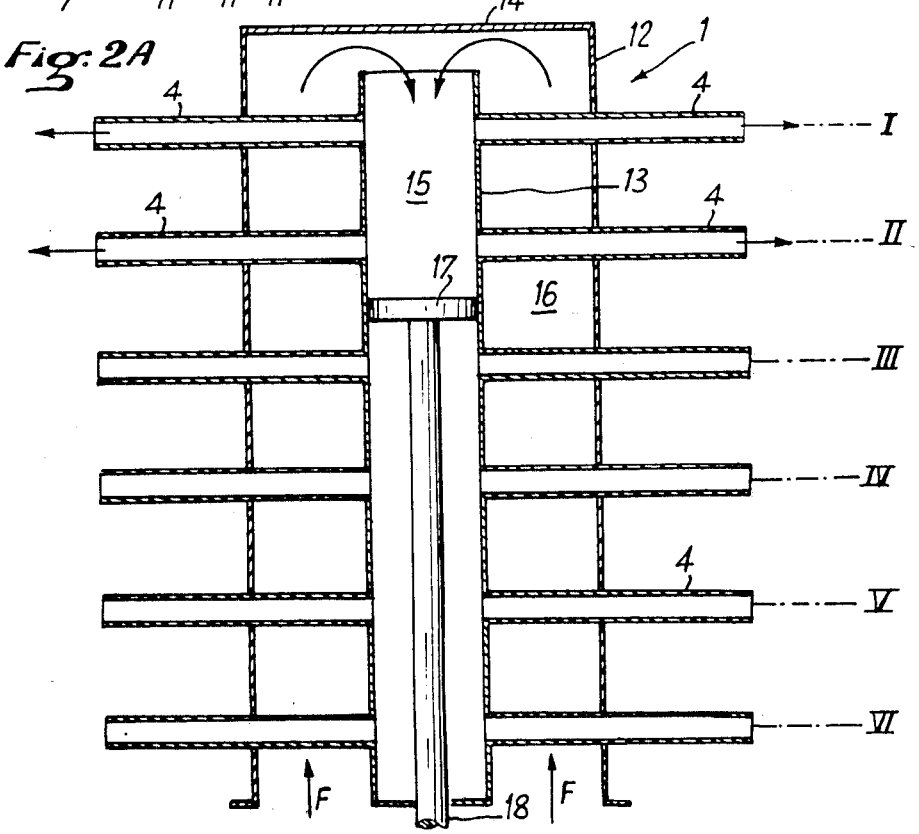

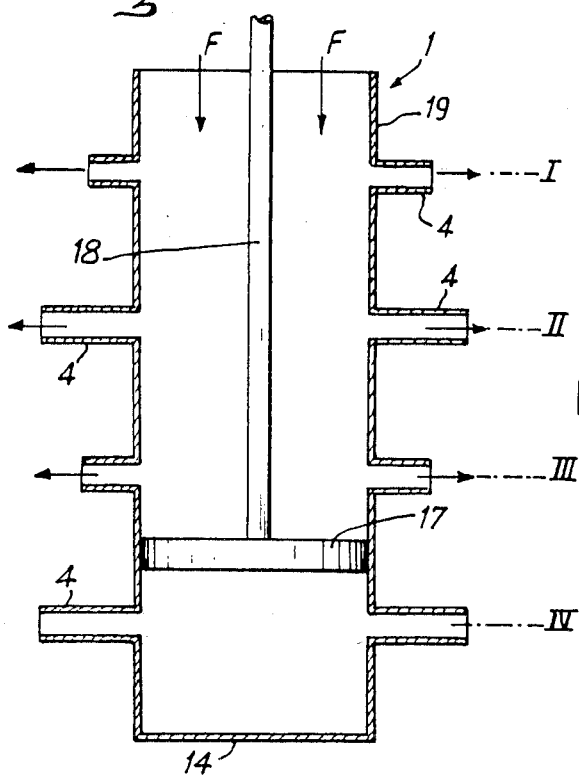
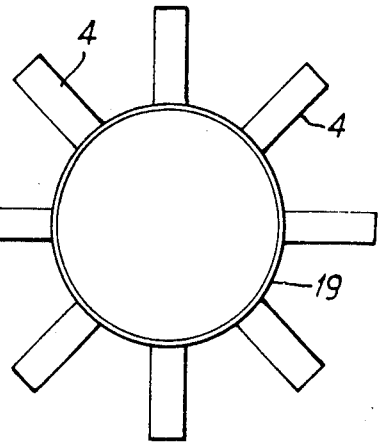
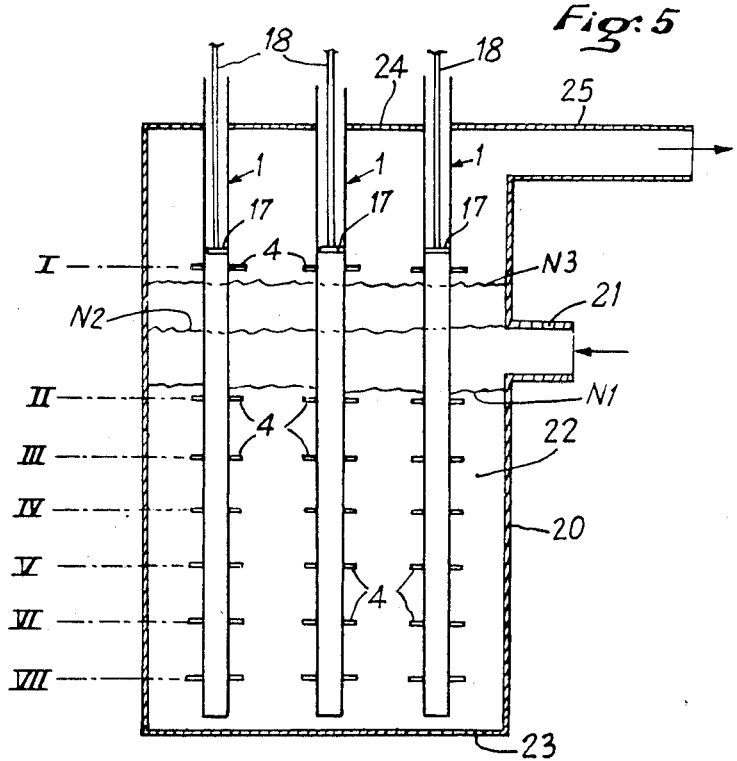

APPARATUS FOR INJECTING FLUIDIZATION GAS

BACKGROUND TO THE INVENTION

The invention relates to an apparatus for injecting fluidization gas, in particular into a bed of material to be fluidized.

Heretofore, a source of compressed air has been used to start up the fluidization of a bed of material to be fluidized. This makes the starting up of the fluidization difficult to control.

SUMMARY OF THE INVENTION

It is an object of the invention to provide apparatus for injecting fluidization gas which injects the gas into the bed of material to be fluidized so that the bed can be brought into a fluidized state without the need to use a source of compressed air.

It is a further object of the invention to simplify the control of the starting up of a plant employing a fluidized bed by employing the apparatus for injecting fluidization gas.

According to the invention there is provided an apparatus for injecting fluidization gas for the fluidization of a bed of material which is held in an enclosure having a bottom, between a lower rest level of the bed and an upper level corresponding to total fluidization of the material, the apparatus comprising at least one conduit which is intended to be connected at one end to a fluidization gas delivery means and to extend between the bottom of the enclosure and the upper fluidization level. In each of several planes spaced in the direction of its length and intended to be ranged between the bottom and the upper fluidization level, the conduit, or each conduit, is equipped with at least one side blowing nozzle. In addition there is a means for placing in successive communication or successive isolation, relative to the fluidization gas delivery means, the blowing nozzle or nozzles which are situated in the successive ranged planes, the arrangement being such that in use the highest nozzle or nozzles are initially supplied with fluidization gas at the start of the supply of fluidization gas.

According to a first embodiment of the invention, the injector comprises several upright conduits, which are joined in a bundle, each conduit having at least one side blowing nozzle in one of the spaced planes. The means for placing in successive communication and isolation comprise a member for opening and closing the respective conduits, the member being mounted at one end, preferably the lower end, of each conduit, and the member is connected to the fluidization gas delivery means. The member may be comprised of a number of such members which can be individual or can be joined together as a collective member, provided that the side nozzles situated in the ranged planes can be brought into service or out of service successively, one set after another in the required order.

According to a second embodiment of the invention, the injector consists of a first conduit mounted coaxially with a second conduit. One of the conduits is connected at one end to the fluidization gas delivery means and the other conduit is equipped in spaced planes with one and preferably several side blowing nozzles opening into the bed of material. An internal transverse shutter is mounted so as to be capable of moving, for example by sliding, in a longitudinal direction in that conduit which is equipped with side nozzles so as to place the nozzles in successive communication and isolation with the fluidization gas delivery means.

According to a third embodiment of the invention, the injector consists of a conduit which is, in use, connected at its top end to the fluidization gas delivery means and is equipped in spaced planes with one and preferably several side blowing nozzles. As the means for placing in successive communication and isolation there is provided an internal transverse shutter which is mounted so as to be capable of moving, for example by sliding, in a longitudinal direction in the conduit.

In a fluidization enclosure, regardless of its purpose, it is possible to mount several injecting apparatus according to the invention, in sufficient number such that they alone are responsible for all of the blowing required for fluidization of the bed of material. It is also possible to mount only some of the injecting apparatus and their action can be combined with that of a blowing grid.

In this case, the principal function of the injecting apparatus is to ensure the starting up of fluidization without it being necessary to blow compressed air at a high pressure through the grid. The present invention also covers any fluidization enclosure which is equipped with at least one injecting apparatus according to the present invention.

In some circumstances, the injecting apparatus employed has at least one side blowing nozzle which is situated at a level which is higher than the highest fluidization level of the bed of material which is inside the fluidization enclosure.

BRIEF DESCRIPTION OF THE DRAWINGS

Embodiments of the present invention will now be described, by way of example only, with reference to the accompanying drawings, in which:

FIG. 1 is a schematic elevation, partly in cross-section, of an apparatus for injecting fluidization gas according to a first embodiment of the invention;

FIGS. 2A and 2B are schematic sectional views, partly in elevation, of two alternative forms of an apparatus for injecting fluidization gas according to a second embodiment of the invention;

FIG. 3 is a schematic sectional view, partly in elevation, of an apparatus for injecting fluidization gas according to a third embodiment of the invention;

FIG. 4 is a top view of the apparatus of FIG. 3, without its movable shuttering means, and FIG. 5 is a schematic sectional view of a fluidized bed combustion boiler equipped with apparatus for injecting fluidization gas according to the third embodiment of the invention.

DESCRIPTION OF THE PREFERRED EMBODIMENTS

Referring to FIG. 1, and injector 1 incorporates several conduits 2A, 2B, 2C, 2D, which are generally upright and are joined together in a bundle. The conduits 2A, 2B, 2C, 2D have different lengths and extend upwardly from a horizontal plane 3, although this arrangement is not strictly essential. Each conduit 2A, 2B, 2C, 2D terminates at its top end in at least one side nozzle 4 which extends generally horizontally. In use, each side nozzle 4 preferably extends within a bed of a material to be fluidized (not shown). In this embodiment there is a longer central conduit 2A having several radiating side nozzles 4 at its top. The other conduits 2B, 2C and 2D are shorter and, since the conduits 2A-2D are grouped as a bundle, are provided at their top with a smaller number of side nozzles 4. However, if desired the other conduits 2B, 2C and 2D may have a greater number of side nozzles 4. Thus, any required number of side blowing nozzles 4 are arranged in several planes I, II, III, which are shown as dot-and-dash lines in FIG. 1. These planes I, II, and III are spaced in the longitudinal direction of the injector 1 and in use are vertically spaced.

At the opposite end to the nozzles 4, each conduit 2A, 2B, 2C, 2D is connected to a means 5 for placing the respective conduit 2A, 2B, 2C, 2D in communication with or in isolation from a fluidization gas delivery means 6. The means 5 for placing can consist of a fixed cylindrical body 7, connected at one end to the gas delivery means 6, and having, on a surface of rotation, an array of terminals 8 along the length of the cylindrical body 7 for connection of the respective conduits 2A, 2B, 2C, 2D. Those conduits 2C, 2D whose side nozzles 4 are in the same plane III are connected to the same terminal 8. A cylindrical rotor 9 which is rotatably coupled with a motor 10 is mounted in the fixed body 7. Cylindrical rotor 9 is pierced with a plurality of holes 11 along its length with each hole 11 being positioned along the length of the cylindrical rotor 9 such that it is along a transverse plane which passes through a respective connection terminal 8. These holes 11 are located on spaced longitudinal lines and the number of holes 11 along each line increases by one between successive lines. When a hole 11 is aligned with a respective terminal 8, gas can pass from the fluidization gas delivery means 6 through the respective hole 11 and terminal 8 and into the respective conduit 2A-2D. Rotation of rotor 9 causes respective lines of holes 11 to become aligned successively with the array of terminals 8 so that the terminals 8 can be successively and selectively aligned with respective holes 11. In this manner, fluidization gas can be supplied first to the highest conduit 2A whose side nozzles 4 are at the level of plane I. After the rotor 9 has been rotated by a fraction of a revolution it is possible to supply simultaneously conduit 2A and conduit 2B, that is to say the side nozzles 4 in the two highest planes I and II. After another rotation of the rotor 9 by a fraction of a revolution, the conduits 2A, 2B, 2C-2D are supplied simultaneously, that is to say the side nozzles in the three planes I, II and III. Conversely, by rotation of the rotor 9 it is possible gradually to shut down the nozzles 4 in the plane III while leaving those in planes II and I functioning. The nozzles 4 in plane II can then be shut down and finally all of the nozzles 4 can be shut down. A complete description of the means 5 for placing can be found be referring to French Patent Sepcification No. 84-01861. Of course, any other means producing an equivalent result could be employed in substitution for that just described, such as, for example, a set of conventional individual valves. It is not necessary to employ as many valves as there are side nozzles 4. It is sufficient to employ as many valves as there are planes I, II, III, the nozzles 4 in each plane being controlled by the same valve. In this way it is possible not only to supply successively the nozzles 4 in each plane I, II, III, but also to regulate the throughput of gas injected in each plane by means of a single valve (for example, as a function of the nature of the fuel employed, in the case of the application of the invention to a fluidized bed combustion boiler).

It will be readily apparent that the embodiment of FIG. 1 could have a larger number of conduits 2 and the nozzles 4 could be provided in a larger number of planes.

In the two alternative forms of an embodiment illustrated in FIGS. 2A and 2B, the injector 1 consists of a first conduit 12 mounted coaxially with a second conduit 13 of smaller size which is enclosed in the first conduit 13. The outer conduit 12 is closed by a head wall 14 at its end and the inner conduit 13 is open and spaced from the head wall 14 so that the inside 15 of the second inner conduit 13 communicates with the annular space 16 between the two conduits 12 and 13.

In the injector which is shown in FIG. 2A, side nozzles 4 are connected to the second inner conduit 13 and extend beyond the first outer conduit 12 into the fluidized bed (not shown). The side nozzles 4 are spaced in the longitudinal direction of the conduits 12 and 13, in successive spaced planes I, II, III, IV, V, VI, which are shown as dot-and-dash lines. In each plane the side nozzles 4 are also spaced in the circumferential direction. Furthermore, preferably the side nozzles 4 are offset in the circumferential direction, for example by 45°, between the successive planes. The diameter of the side nozzles 4 in each plane is calculated, in a manner known per se, as a function of the corresponding pressure drop in the fluidized bed and of the throughput of gas to be injected.

In the injector which is shown in FIG. 2B, the side nozzles 4 extend from the first outer conduit 12 in several successive planes in a manner which is similar to that of the nozzles in FIG. 2A.

In both these arrangements, the conduit which is not provided with side nozzles 4, namely the outer conduit 12 in FIG. 2A and the inner conduit 13 in FIG. 2B, is connected at its lower end to the fluidization gas delivery means, as indicated by arrows F in those figures.

Also, in both those embodiments the means for placing in communication and isolation consists of an inner transverse piston-like shutter 17 which is mounted for sliding longitudinal movement in that conduit which is provided with side nozzles 4. In the case of FIG. 2B, the shutter 17 is annular and also slides along the outer surface of the inner conduit 13 which it surrounds. The shutter 17 in each embodiment is fixed to an operating member 18 which enables it to be placed in successive positions between the planes I, II, III and so on where the side nozzles 4 are positioned.

In the embodiment of FIG. 2A, the fluidization gas which is delivered to the outer conduit 12 passes through the annular space 16, enters the inner conduit 13 and leaves by those side nozzles 4 to which it is given access due to the particular position of the shutter 17. In the embodiment of FIG. 2B, the fluidization gas is delivered through the inner conduit 13 before entering the outer conduit 12 and leaving the outer conduit 12 via the side nozzles 4 which are open due to the position of the shutter 17. It can be seen that the side nozzles 4 in the highest plane I are brought into operation first, and then those in planes II, III and so on, are opened in succession. In the embodiment illustrated in FIG. 3, the injector 1 consists of a single upright conduit 19 from which side nozzles 4 extend, the nozzles 4 being arranged in spaced planes I, II, III, IV, as explained earlier.

Conduit 19 is closed by a bottom head wall 14 at its lower end and is connected to the fluidization gas delivery means, as indicated by arrows F, at its upper end. A movable shutter 17 can be moved in this conduit 19, starting at the top, by means of operating member 18.

As explained above, all the side nozzles 4 can be gradually brought into operation, starting with those in the highest plane I.

FIG. 4 shows that the nozzles 4 are spaced uniformly circumferentially and, preferably, displaced angularly between the successive planes I, II, III and so on, as already stated.

FIG. 5 illustrates an example of the use of the injector 1 of the invention. The injector 1 may be used in a combustion boiler with a fluidized bed of a granular fuel. The latter is delivered to a hearth 20 by a supply line 21. When at rest, the fuel 22 occupies the volume available between the bottom 23 of the hearth and a lower level N1 which is the level of the bed at rest. When incompletely fluidized, the bed reaches a higher level N2. In the state of complete fluidization the bed can rech a still higher level N3. The supply line 21 opens into the hearth 20 at the level N1 or above. At its top, the hearth 20 is closed by a top wall 24 and a conduit 25 is provided for fume removal.

In this hearth 20 are arranged several injectors 1 which are of the type illustrated in FIG. 3. The injectors 1 pass through the top wall 24 so that the operating members 18 of the movable shutters 17 are accessible from outside the hearth 20. The injectors 1 extend from the hearth bottom 23 to above the complete fluidization level N3. The side nozzles 4 of the injectors 1 are located in several spaced planes I to VII, which are shown by dot-and-dash lines, so that the nozzles 4 in the lowest planes II to VII are submerged in the bed at rest below the level N1. In this particular example, the nozzles 4 in the highest plane I are above the level N3 of the bed in the completely fluidized state and can be used to deliver secondary combustion air.

Whatever the state of the bed, even if the bed is at rest, it can be fluidized without the use of compressed air by bringing into operation the nozzles 4 which are located in that plane which is just below the level reached by the bed. For example, when the bed is at rest, the blowing nozzles 4 which are located in planes I and II are brought into operation by lowering the shutters 17. The nozzles 4 in plane II are covered by a relatively thin layer of the bed with the result that the gas which is blown through them brings this layer readily into a state of fluidization. The shutters 17 are lowered further so that the same operation takes place successively, by means of the nozzles in the planes III, then IV, up to VII so as to fluidize successively the layers of the bed which cover those planes. When the shutters 17 of all the injectors 1 reach their lowest position, all the side nozzles 4 are in operation and the fluidized bed reaches its highest level N3.

It is preferable to place the injectors 1 in a vertical position, but it is also possible to give them an inclination so long as that does not prevent the side nozzles 4 from being placed in spaced planes which are vertically separated as already explained. The spacing of the planes does not necessarily have to be uniform. In some circumstances it may be preferable to provide a different spacing of the planes which contain the blowing nozzles 4.

What I claim is:

1. Apparatus for injecting starting-up fluidization gas between a lower level and an upper level of a bed of material held in an enclosure having a bottom, which apparatus comprises at least one conduit which can be connected at one end thereof to a fluidization gas delivery means and can extend in the enclosure between the bottom of the enclosure and an upper fluidization level, a plurality of nozzles which are provided on the at least one conduit such that the or each conduit has at least one nozzle for blowing fluidization gas into the enclosure from the respective conduit the nozzles being disposed in several planes which are spaced in a direction along the length of the at least one conduit so that the nozzles can be spaced between the upper fluidization level and the bottom of the enclosure, and means for selectively communicating in succession the nozzles which are in the successive spaced planes with the fluidization gas delivery means, such that the highest nozzle or nozzles can be communicated with the fluidization gas delivery means and then the lower nozzles successively, said at least one conduit consisting of a first outer conduit which is closed at one end thereof and a second conduit which is mounted inside the first conduit and spaced from the said closed end, one of the first and second conduits being provided with the said nozzles on a side wall thereof, the nozzles being spaced circumferentially and the said one conduit being closed at that end which is remote from the closed end of the first conduit, and said means for selectively communicating comprising a movable transverse shutter which is connected to an operating member and is mounted in the said conduit which has the nozzles, the conduit not having the nozzles being connected to the fluidization gas delivery means via that end thereof which is remote from the said closed end of the first conduit.

2. Apparatus for injecting starting-up fluidization gas according to claim 1, wherein that conduit which is fitted with the nozzles is the second conduit and the nozzles extend beyond the first conduit.

3. Apparatus for injecting starting-up fluidization gas according to claim 1, wherein that conduit which is fitted with the nozzles is the first conduit and the shutter is annular and capable of moving along both the first and the second conduits.

4. A fluidization enclosure comprising at least one apparatus for injecting starting-up fluidization gas according to claim 1, wherein the or each apparatus for injecting fluidization gas has at least one of the nozzles located above the level of the material which is held in the enclosure in use when the material is completely fluidized so that said apparatus has the triple function of feeding a gas as a starting-up gas, feeding the same gas as a fluidizing gas, feeding the same gas as a secondary reacting gas.

5. A fluidization enclosure according to claim 4 which is adapted for the combustion of a granular fuel in the presence of air which is employed as starting-up gas, fluidization gas and secondary combustion gas.

* * * * *